(12) United States Patent
Morozini De Lira

(10) Patent No.: US 12,734,987 B2
(45) Date of Patent: Sep. 15, 2026

(54) OCCUPANT PROTECTION DEVICE FOR A MOTOR VEHICLE AND SEAT BELT UNIT

(71) Applicant: Dr. Ing. h.c. F. Porsche Aktiengesellschaft, Stuttgart (DE)

(72) Inventor: Adriano Morozini De Lira, Stuttgart-Vaihingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 41 days.

(21) Appl. No.: 18/932,684

(22) Filed: Oct. 31, 2024

(65) Prior Publication Data

US 2025/0145101 A1 May 8, 2025

(30) Foreign Application Priority Data

Nov. 8, 2023 (DE) ..................... 10 2023 130 962.5

(51) Int. Cl.
*B60R 21/015* (2006.01)
*B60R 21/00* (2006.01)
(Continued)

(52) U.S. Cl.
CPC .. *B60R 21/01544* (2014.10); *B60R 21/01516* (2014.10); *B60R 2021/003* (2013.01);
(Continued)

(58) Field of Classification Search
CPC ........ B60R 21/01516; B60R 21/01544; B60R 22/12; B60R 2021/003;
(Continued)

(56) References Cited

U.S. PATENT DOCUMENTS

| | | | |
|---|---|---|---|
| 6,572,148 | B2 | 6/2003 | Wittenberg |
| 11,479,206 | B2 | 10/2022 | Radunz et al. |
| 2022/0128422 | A1 | 4/2022 | Cech et al. |

FOREIGN PATENT DOCUMENTS

| | | | |
|---|---|---|---|
| DE | 10026444 | A1 | 12/2001 |
| DE | 102006040244 | B3 | 8/2007 |

(Continued)

OTHER PUBLICATIONS

Suzuki, M; JP 6,235,957; machine translation. (Year: 2017).*
Suzuki, M; JP 6,276,631; machine translation. (Year: 2018).*

*Primary Examiner* — Mark L. Greene
(74) *Attorney, Agent, or Firm* — LEYDIG, VOIT & MAYER, LTD.

(57) ABSTRACT

An occupant protection device includes at least one adaptive restraint system with a restraint device and a sensor device configured to acquire at least one occupant-specific parameter, and a control device. The control device is adapted and configured to control the restraint device at least in the event of an accident as a function of the occupant-specific parameter. The sensor device includes a textile pressure sensor integrated into a belt webbing of a seat belt and provides a large number of spatially distributed pressure signals. The sensor device includes an evaluation unit adapted and configured to register the pressure signals in a spatially resolved manner and ascertain a pressure distribution that describes a spatial distribution of a force exerted on the seat belt by the person wearing the seat belt and provide the pressure distribution as an occupant-specific parameter to the control device for controlling the restraint device.

12 Claims, 2 Drawing Sheets

(51) Int. Cl.
*B60R 21/01* (2006.01)
*B60R 22/12* (2006.01)
*B60R 22/48* (2006.01)

(52) U.S. Cl.
CPC ............... *B60R 2021/01034* (2013.01); *B60R 2021/01211* (2013.01); *B60R 2021/01272* (2013.01); *B60R 22/12* (2013.01); *B60R 2022/4808* (2013.01)

(58) Field of Classification Search
CPC . B60R 2021/01034; B60R 2021/01211; B60R 2021/01272; B60R 2022/4808
See application file for complete search history.

(56) References Cited

FOREIGN PATENT DOCUMENTS

| | | | | |
|---|---|---|---|---|
| DE | 102006027414 | A1 | | 12/2007 |
| DE | 10345726 | B4 | | 11/2013 |
| DE | 102020205180 | B4 | | 5/2022 |
| DE | 102020214871 | A1 | | 6/2022 |
| DE | 112021004410 | T5 | | 7/2023 |
| JP | 6235957 | B2 | * | 11/2017 |
| JP | 6276631 | B2 | * | 2/2018 |

* cited by examiner

OCCUPANT PROTECTION DEVICE FOR A MOTOR VEHICLE AND SEAT BELT UNIT

CROSS REFERENCE TO RELATED APPLICATIONS

This application claims benefit to German Patent Application No. DE 10 2023 130 962.5, filed on Nov. 8, 2023, which is hereby incorporated by reference herein.

FIELD

The present invention relates to an occupant protection device for a motor vehicle with at least one adaptive restraint system.

BACKGROUND

Occupant protection devices are intended to minimize or ideally completely prevent injuries to the occupants in the event of an accident. There is a risk that the restrained person can be injured in the event of an accident, however; for example because the airbag or the seat belt is not adapted to the seat position or other specific characteristics of the occupant to be restrained. For this reason, so-called adaptive restraint systems are used in modern vehicles, in which the restraint devices can be adjusted to specific characteristics of the occupant to be restrained.

DE 103 45 726 B4 describes an adaptive restraint system in which the weight of the occupant is measured by means of a pressure-dependent film in the seat cushion or via weight sensors in the seat. The size and position of the occupant can be ascertained by a camera via image processing. This data is used to adjust the force of a belt tensioner.

An occupant protection device which comprises an observation device with a camera for detecting a marking on a seat belt is known from DE10 2020 214 871 A1. The marking is used to calculate measured values, based on which occupant-specific characteristics and, for example, a posture, a viewing direction or a head position, are ascertained. This makes it possible to set safety functions or comfort functions in the vehicle and, for example, a vehicle seat or a steering wheel, to the occupant-specific characteristics in the event of an accident.

SUMMARY

In an embodiment, the present disclosure provides an occupant protection device for a motor vehicle, comprising at least one adaptive restraint system with at least one restraint device and with at least one sensor device configured to acquire at least one occupant-specific parameter and at least one control device. The control device is adapted and configured to control the at least one restraint device at least in the event of an accident as a function of the occupant-specific parameter. The sensor device comprises at least one textile pressure sensor that is integrated into a belt webbing of a seat belt and provides a large number of spatially distributed pressure signals. The sensor device comprises at least one evaluation unit that is adapted and configured to register the pressure signals in a spatially resolved manner and ascertain a pressure distribution that describes a spatial distribution of a force exerted on the seat belt by the person wearing the seat belt and provide the pressure distribution as an occupant-specific parameter to the control device for controlling the restraint device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
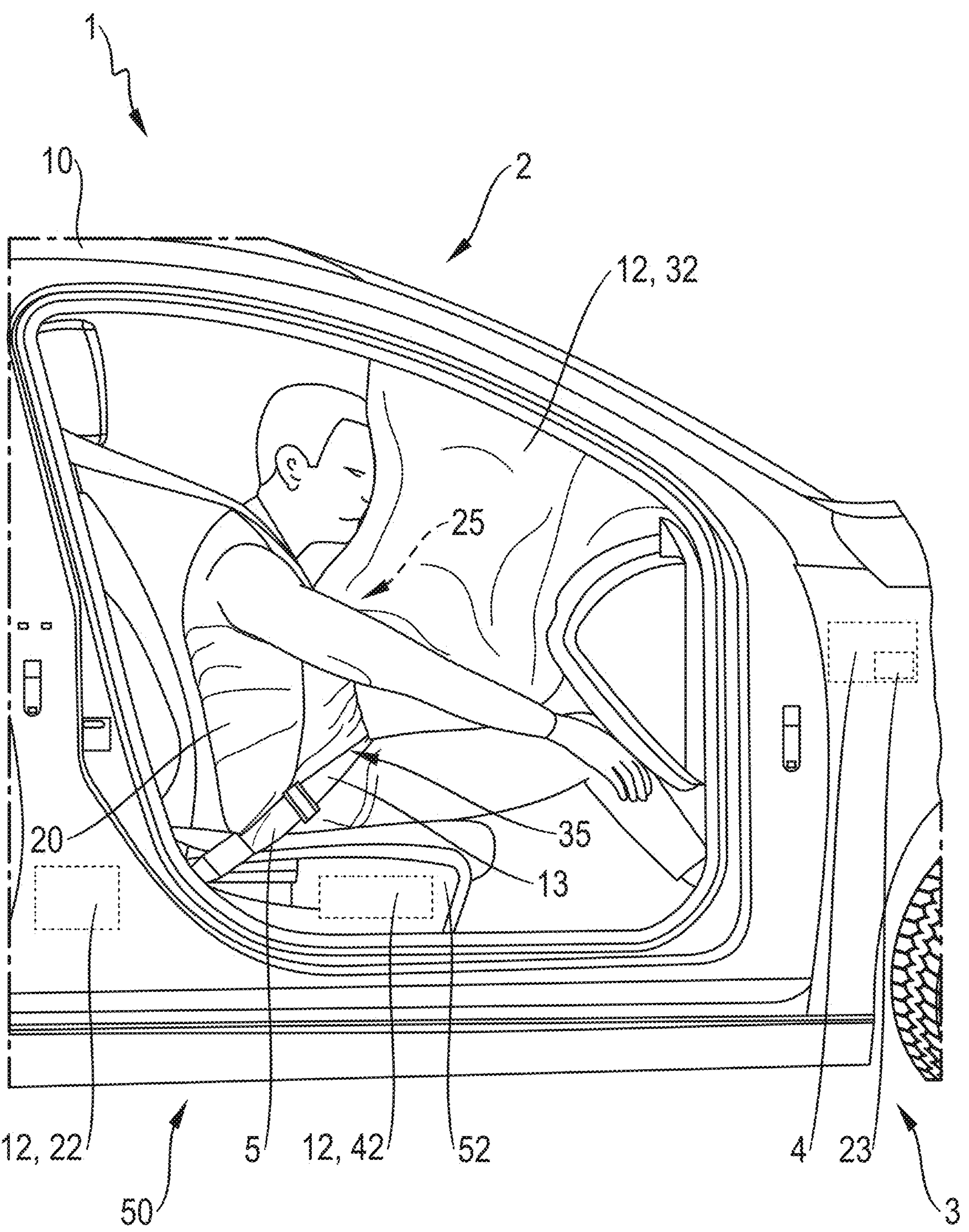
FIG. 1 is a schematic illustration of a motor vehicle with an occupant protection device according to an embodiment of the invention.

In an embodiment, the present invention provides an improved occupant protection device. According to an embodiment, it is possible to ascertain an occupant-specific parameter in a particularly safe and reliable manner. The occupant protection device can also be integrated into the vehicle in a space-saving and structurally simple manner.

The occupant protection device according to an embodiment of the invention is provided for a motor vehicle, and in particular for a passenger car. The occupant protection device comprises at least one adaptive restraint system with at least one (adaptive) restraint device and at least one sensor device for acquiring at least one occupant-specific parameter and at least one sensor device. The control device is adapted and configured to control and in particular adjust the at least one restraint device at least in the event of an accident as a function of the occupant-specific parameter. The sensor device comprises at least one textile pressure sensor. The pressure sensor is (fixedly) integrated into a belt webbing of a seat belt. The pressure sensor in particular provides a large number of spatially distributed (location-specific) pressure signals. The sensor device comprises at least one evaluation unit (which is operatively connected to the pressure sensor). The evaluation unit is adapted and configured to register the (location-specific) pressure signals in a spatially resolved manner and ascertain a pressure distribution (using the spatially resolved registered pressure signals). The pressure distribution in particular describes a spatial distribution of a force exerted on the seat belt by the person wearing the seat belt. The evaluation unit is adapted and configured to provide the pressure distribution as an occupant-specific parameter to the control device for controlling the restraint device. The control device is in particular adapted and configured to take the pressure distribution into account when controlling the at least one restraint device at least in the event of an accident.

Embodiments of the present invention offer many advantages. A significant advantage is provided by the sensor device with the textile pressure sensor integrated into the seat belt. The occupant-specific parameter can thus be acquired safely and reliably. The pressure distribution is also a particularly meaningful parameter for the individual description of the occupant. This makes it possible to adjust the restraint system very specifically to the individual characteristics of the occupant. It is also particularly advantageous that the pressure sensor can be integrated into the vehicle in a space-saving and at the same time structurally simple manner.

It is preferred and advantageous that the textile pressure sensor is woven into the belt webbing of the seat belt. This enables a particularly reliable and at the same time space-saving integration of the pressure sensor. It also enables a particularly reliable acquisition of the pressure signals even over large areas of the seat belt and, for example, over the entire extendable length. The pressure sensor in particular extends over at least a third and preferably over at least half the length of the seat belt. The pressure sensor in particular comprises at least one thread arrangement with a large number of (conductive) threads. The threads are in particular textile. The threads are in particular at least partly incorporated and preferably woven into the belt webbing.

The at least one restraint device can be configured as a belt tensioning device. The belt tensioning device serves in particular to tighten and/or retract (or also to selectively relax) the seat belt equipped with the pressure sensor, in particular in the event of an accident.

The at least one restraint device can be configured as an airbag device. The airbag device in particular comprises at least one airbag unit, which can be controlled as a function of the occupant-specific parameter. The airbag device can also comprise two or three or more airbag units. The airbag units can in particular all be controlled individually as a function of the occupant-specific parameter.

The at least one restraint device can be configured as a seat positioning device for positioning at least a part of a seat. The seat positioning device in particular serves to position the seat that is equipped with the seat belt with the pressure sensor. The seat can be partially or fully positionable. A seat surface and/or a backrest and/or a headrest can be adjustable, for instance. It is also provided for the seat as a whole to be adjustable along at least one axis.

The occupant protection device can also comprise at least two or at least three or more restraint devices that are preferably all configured as described above. The control device is in particular adapted and configured to control the above-described configurations of the restraint device as a function of the occupant-specific parameter.

It is preferred and advantageous that the control device is adapted and configured to adjust a restraining force of the seat belt (which is equipped with the pressure sensor) as a function of the occupant-specific parameter and preferably at least the pressure distribution. The control device in particular sets the restraining force such that no unfavorable or dangerous pressure distributions occur. In addition to the at least one occupant-specific parameter, the control device preferably also takes into account other parameters ascertained by means of sensors that characterize the forces that occur during the accident.

It is preferred and advantageous that the control device is adapted and configured to adjust an airbag pressure and/or a seat position as a function of the occupant-specific parameter (preferably at least the pressure distribution). The control device can particularly preferably match the restraining force of the seat belt and the airbag pressure and the seat position to one another as a function of the occupant-specific parameter. If the pressure distribution indicates a particularly heavy weight of the person, for example, the airbag pressure and the restraining force of the seat belt and the seat position can be specifically matched to one another. The restraining force and/or the seat position and/or the airbag pressure are in particular controlled based on the force distribution between the chest and the abdomen acquired by the integrated pressure sensor.

In an advantageous configuration, the pressure sensor is integrated into the belt webbing at least where the seat belt extends across the chest and/or abdomen when used as intended. The evaluation unit is in particular adapted and configured to separately ascertain the pressure distribution in a chest area of the seat belt and in an abdominal area of the seat belt. The seat belt in particular comprises at least one intended chest area and at least one intended abdominal area.

The evaluation unit is preferably adapted and configured to calculate a chest-specific pressure load and an abdomen-specific pressure load from the separately ascertained pressure distributions for the chest area and the abdominal area. The evaluation unit can in particular ascertain the occupant-specific parameter at least on the basis of the force distribution or pressure distribution between the chest and the abdomen. The control device is in particular adapted and configured to adjust the restraining force of the seat belt and/or the seat position and/or the airbag pressure at least on the basis of a force distribution or pressure distribution between the chest and the abdomen.

It is provided for the evaluation unit to independently recognize which portion of the pressure sensor is in the chest area and which portion of the pressure sensor is in the abdominal area. It is provided for the evaluation unit to individually ascertain and define the chest area and the abdominal area of the seat belt from an acquired pressure distribution. In other words, the evaluation unit can independently recognize which part of the seat belt extends over the chest and which part of the seat belt extends over the abdomen when a person is wearing the seat belt based on the pressure distribution.

The control device is preferably adapted and configured to adjust a restraining force of the seat belt and/or a seat position and/or an airbag pressure as a function of the chest-specific and the abdomen-specific pressure load. The adjustment is in particular carried out in such a way that a targeted load distribution between the chest area and the abdominal area of the seat belt can be set in the event of an accident. In other words, the control device carries out a targeted adjustment of the respective restraint device with knowledge of the chest-specific and the abdomen-specific pressure load, so that excessive local loads, for instance on the chest and abdomen, are avoided.

The here described ascertainment of the occupant-specific parameter in particular takes place at least in the event of an accident and/or at least when it is recognized that an accident is about to occur. The adjustment of the at least one restraint device is in particular carried out as a function of the occupant-specific parameter at least in the event of an accident and/or at least when it is recognized that an accident is about to occur.

In an advantageous and preferred further development, the control device is adapted and configured to control the at least one restraint device as a function of the occupant-specific parameter, and preferably at least the pressure distribution, during normal operation as well (in particular without recognizing that an accident is about to occur). The comfort of tall or heavy or pregnant persons, for example, can thus be improved significantly while driving.

The control device is preferably adapted and configured to relax the seat belt in a defined manner and/or change a seat position in a defined manner during normal operation. It is provided for the control device to take the chest-specific and/or the abdomen-specific pressure load into account, so that a particularly comfortable pressure distribution between the chest and the abdomen can be set. The control device in particular carries out the above-described adjustments if a pressure distribution between the chest and the abdomen is above a limit value.

The seat belt unit according to an embodiment of the invention comprises at least one seat belt and at least one textile pressure sensor integrated into the seat belt. The seat belt unit is in particular provided for use with the occupant protection device according to an embodiment of the invention or one of its configurations. Use of a textile pressure sensor integrated into a seat belt for an occupant protection device is also provided. The seat belt and the pressure sensor are in particular configured as described above for the occupant protection device according to embodiments of the invention.

The pressure sensor reacts in particular as a function of a force acting upon it with a targeted change in an electrical resistance and/or a targeted change in a capacitance. The pressure sensor then in particular outputs the pressure signals as voltage signals. The pressure sensor reacts in particular as a function of a force acting upon it with a targeted change in an electrical resistance and/or a targeted change in a capacitance. The change in electrical resistance and/or the change in capacitance in particular causes a defined change in the respective voltage signal.

In the context of the present disclosure, the term "pressure" can also be replaced with "force". The pressure sensor is then in particular a force sensor and is used to ascertain a force distribution. The force measurement can then be used not only to monitor a pressure on the seat belt, for example, but, for instance, also to monitor a stretching or other deformation of the seat belt.

The pressure sensor in particular comprises at least one and preferably at least two conductive (textile) thread arrangements that are connected to and in particular woven into a resistive and/or capacitive (textile) layer. The layer in particular changes its resistance and/or its capacitance as a function of a force exerted upon it.

The pressure sensor in particular comprises a large number of measurement points which are distributed over an acquisition surface. The measurement points in particular each provide at least one pressure signal (which depends on the pressure on the pressure sensor). The pressure sensor in particular provides a large number of spatially resolved sensor signals and preferably electrical voltage signals. The evaluation unit can in particular acquire and evaluate the pressure signals in a spatially resolved manner. The evaluation unit can in particular determine the pressure distribution using the acquired spatially resolved pressure signals. The pressure distribution in particular describes a distribution of the individual pressure signals over an acquisition surface of the pressure sensor. The acquisition surface of the pressure sensor extends in particular over at least a part of the seat belt. The acquisition surface extends in particular at least over the parts of the seat belt that extend across the chest and/or the abdomen of the person secured with the seat belt when used as intended.

The pressure sensor can also be referred to as a textile surface sensor. The pressure signals can also be referred to as sensor signals. The pressure signals are in particular voltage signals. In addition to the textile pressure sensor, the sensor device can comprise at least one further sensor unit for acquiring an occupant-specific parameter. It is provided for the control device to use the at least two occupant-specific parameters to form a higher-level parameter. In addition to the occupant-specific parameter, the control device in particular also takes into account at least one parameter acquired by means of sensors that characterizes the forces acting during the accident. For instance, sensor means are provided for acquiring an acceleration or the like.

The control device and the evaluation unit can be integrated into a control unit or can also be configured separately. The control device and/or the evaluation unit in particular include at least one algorithm for carrying out the steps described here. The control device and/or the evaluation unit are in particular adapted and configured to carry out the steps formulated in a method-like manner. When reference is made in the context of the present disclosure to a measure in the event of an accident, this is in particular also understood to mean that the measure can be carried out when it is recognized that an accident is about to occur.

The occupant-specific parameter in particular describes an effect of force or pressure on the seat belt caused by the person secured with the seat belt in the event of an accident. The seat belt is in particular at least one three-point seat belt. A motor vehicle with an occupant protection device according to embodiments of the invention is also provided. In particular, at least one occupant protection device is provided for at least some of the provided seats.

Further advantages and features of embodiments of the present invention will emerge from the embodiment examples which are discussed in the following with reference to the accompanying figures.

FIG. 1 shows a motor vehicle 10 with an occupant protection device 1 according to an embodiment of the invention with an adaptive restraint system 2 during an example of an accident. A person 20 on a seat 52, in this case the front passenger seat, is wearing a seat belt 5. The occupant protection device 1 is described for the front passenger seat here purely as an example. The driver seat or at least one rear seat can additionally or alternatively be equipped with the occupant protection device 1 as well.

As an example, the restraint system 2 here comprises three restraint devices 12; namely a belt tensioning device 22 and an airbag device 32 and also a seat positioning device 42. The belt tensioning device 22 serves to pretension or retract the seat belt 5. Of the airbag device 32, only an airbag unit configured as a front airbag is shown here as an example. The seat positioning device 42 can be used to position the entire seat 52 or only parts of the seat 52 (for example the seat surface, the backrest and/or the headrest).

The restraint system 2 comprises a control device 4, which, in the event of an accident, adjusts the restraint devices 12 in a targeted manner as a function of an occupant-specific parameter. This allows the belt tensioning device 22 and the airbag device 32 and also the seat positioning device 42 to be specifically adjusted to the individual characteristics of the occupant. This significantly reduces the risk that the restrained person will be injured in the event of an accident.

The occupant-specific parameter is acquired using a sensor device 3 with one or more sensor units. To ascertain the occupant-specific parameter in a particularly reliable and at the same time uncomplicated and space-saving manner, at least one of the sensor units is configured as a textile pressure sensor 13. The pressure sensor 13 here is fixedly integrated and, for example, woven into the seat belt 5. The textile pressure sensor 13 can also be referred to as a surface sensor and provides a large number of pressure signals which are spatially distributed over the length of the seat belt 5.

Such a seat belt 5 can also be referred to as a so-called smart textile. Embodiments of the present invention presented here therefore have the advantage that the function of the sensor device 3 and in particular the force and pressure measurement is integrated into the belt webbing 15. In this respect, the seat belt 5 can thus take on a new function.

An evaluation unit 23 can register the pressure signals in a spatially resolved manner and use them to ascertain a pressure distribution. The pressure distribution describes a spatial distribution of a force exerted on the seat belt 5 by the person 20 wearing the seat belt. The pressure sensor 13 extends so far across the seat belt 5 that pressure signals can be acquired at least where the chest and abdomen of the secured person 20 are located when used as intended.

The evaluation unit 23 provides the ascertained pressure distribution to the control device 4. The evaluation unit 23 here is integrated into the control device 4, for example. The control device 4 then takes into account the pressure distribution alone or together with other occupant-specific parameters acquired by means of sensors in order to set the restraining force of the seat belt 5 individually to the person 20. Additionally or alternatively, the airbag pressure and/or the seat position are adjusted in this manner as well.

In particular a communication and interpretation cycle is carried out before the individual restraint devices 12 are actuated. The pressure distribution and other data are interpreted by the control device 4 in a context-related form with other components of the vehicle 10 and other vehicle parameters, such as the speed or the like, for instance.

In an example variant of the occupant protection device 1, the evaluation unit 23 can ascertain the pressure distribution in a chest area 25 and in an abdominal area 35 of the seat belt 5 separately and use it to calculate a chest-specific and an abdomen-specific pressure load. In the event of an accident, the restraining force of the seat belt 5 and/or the seat position and/or the airbag pressure can then be adjusted such that a targeted load distribution between the chest area 25 and the abdominal area 35 of the seat belt 5 can be set. This allows the load on the body of the person 20 wearing the seat belt to be distributed in a particularly favorable manner.

In an advantageous variant, the occupant protection device 1 shown here can also be used to improve comfort during normal operation. The control device 4 then sets the restraining force or the seat position, for example, as a function of the ascertained pressure distribution in order to avoid unfavorable pressure loads on the person 20 wearing the seat belt while driving.

Figure 2:
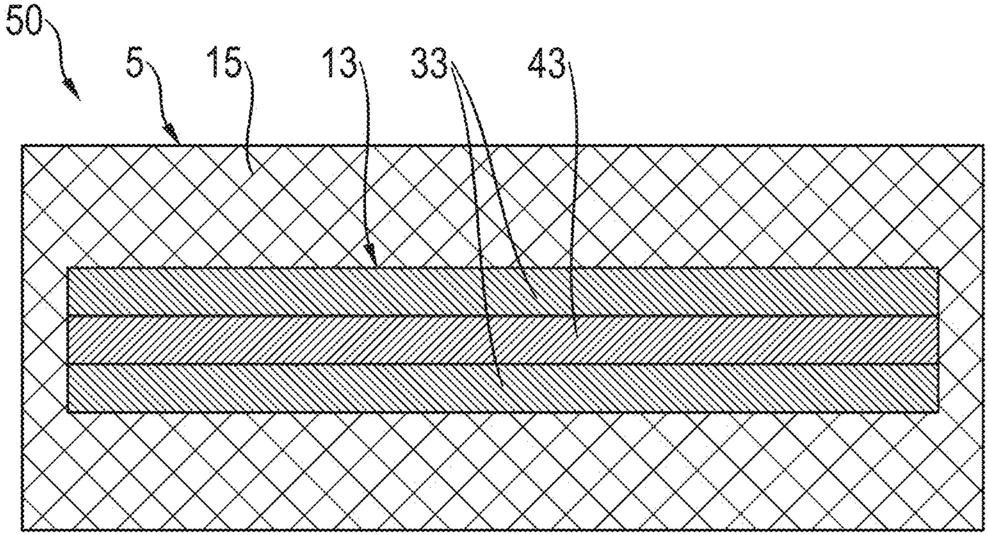
FIG. 2 illustrates an occupant protection device according to an embodiment of the invention in a cross-sectional view.

FIG. 2 shows a seat belt unit 50 with a seat belt 5 with a textile belt webbing 15. A textile pressure sensor 13 is fixedly integrated and, for example, woven into the belt webbing 15. The seat belt unit 50 shown here can, for instance, be used for the occupant protection device 1 described above. The pressure sensor 13 is part of a sensor device 3 as described previously with reference to FIG. 1. The seat belt 5 is shown here with a view of its cross-sectional area. For better illustration, the individual components are not shown to scale here.

The pressure sensor 13 can, for instance, react here as a function of a force acting upon it with a targeted change in an electrical resistance or a targeted change in a capacitance. The pressure sensor 13 includes one or at least two textile thread arrangements 33, for example, each of which comprises a plurality of conductive threads. Between the thread arrangements 33 there is a resistive or capacitive layer 43. The layer 43 changes its resistance or capacitance as a function of the pressure. The threads of the thread arrangements 33 are connected to the evaluation unit 23 individually or in groups, so that a spatially resolved acquisition of the pressure signals or voltage signals is provided.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Occupant protection device
2 Restraint system
3 Sensor device
4 Control device
5 Seat belt
10 Motor vehicle
12 Restraint device
13 Pressure sensor
15 Belt webbing
20 Person
22 Belt tensioning device
23 Evaluation unit
25 Chest area
32 Airbag device
33 Thread arrangement
35 Abdominal area
42 Seat positioning device
43 Layer
50 Seat belt unit
52 Seat

The invention claimed is:

1. An occupant protection device for a motor vehicle, comprising:

at least one adaptive restraint system with at least one restraint device and with at least one sensor device configured to acquire at least one occupant-specific parameter; and at least one control device, wherein the control device is adapted and configured to control the at least one restraint device at least in the event of an accident as a function of the occupant-specific parameter, wherein the sensor device comprises at least one textile pressure sensor that is integrated into a belt webbing of a seat belt and provides a plurality of spatially distributed pressure signals, wherein the sensor device comprises at least one evaluation unit that is adapted and configured to register the pressure signals in a spatially resolved manner and ascertain a pressure distribution that describes a spatial distribution of a force exerted on the seat belt by a person wearing the seat belt and provide the pressure distribution as an occupant-specific parameter to the control device for controlling the restraint device, and wherein the textile pressure sensor is woven into the belt webbing of the seat belt.

2. The occupant protection device according to claim 1, wherein the at least one restraint device is configured as a belt tensioning device and/or an airbag device.

3. The occupant protection device according to claim 1, wherein the control device is adapted and configured to adjust a restraining force of the seat belt as a function of the occupant-specific parameter.

4. The occupant protection device according to claim 1, wherein the control device is adapted and configured to adjust an airbag pressure as a function of the occupant-specific parameter.

5. The occupant protection device according to claim 1, wherein the pressure sensor is integrated into the belt webbing at least where the seat belt is configured to extend across a chest and an abdomen of the person, and wherein the evaluation unit is adapted and configured to separately ascertain the pressure distribution in a chest area of the seat belt and in an abdominal area of the seat belt and thereby calculate a chest-specific pressure load and an abdomen-specific pressure load.

6. The occupant protection device according to claim 5, wherein the control device is adapted and configured to adjust a restraining force of the seat belt and/or a seat position and/or an airbag pressure, as a function of the chest-specific pressure load and the abdomen-specific pressure load, so that a targeted load distribution between the chest area and the abdominal area of the seat belt can be set in the event of an accident.

7. The occupant protection device according to claim 1, wherein the control device is adapted and configured to control the at least one restraint device as a function of the occupant-specific parameter.

8. The occupant protection device according to claim 7, wherein the control device is configured to relax the seat belt in a defined manner and/or change a seat position in a defined manner.

9. A seat belt unit comprising at least one seat belt and at least one textile pressure sensor integrated into the at least one seat belt for an occupant protection device according to claim 1.

10. The occupant protection device according to claim 1, wherein the at least one restraint device is configured as a seat positioning device for positioning at least a part of a seat.

11. The occupant protection device according to claim 1, wherein the control device is adapted and configured to adjust a seat position as a function of the occupant-specific parameter.

12. An occupant protection device for a motor vehicle, comprising:

at least one adaptive restraint system with at least one restraint device and with at least one sensor device configured to acquire at least one occupant-specific parameter; and at least one control device, wherein the control device is adapted and configured to control the at least one restraint device at least in the event of an accident as a function of the occupant-specific parameter, wherein the sensor device comprises at least one textile pressure sensor that is integrated into a belt webbing of a seat belt and provides a plurality of spatially distributed pressure signals, wherein the sensor device comprises at least one evaluation unit that is adapted and configured to register the pressure signals in a spatially resolved manner and ascertain a pressure distribution that describes a spatial distribution of a force exerted on the seat belt by a person wearing the seat belt and provide the pressure distribution as an occupant-specific parameter to the control device for controlling the restraint device, wherein the pressure sensor is integrated into the belt webbing at least where the seat belt is configured to extend across a chest and an abdomen of the person, and wherein the evaluation unit is adapted and configured to separately ascertain the pressure distribution in a chest area of the seat belt and in an abdominal area of the seat belt and thereby calculate a chest-specific pressure load and an abdomen-specific pressure load.

* * * * *